United States Patent [19]

Muramoto

[11] 4,291,899
[45] Sep. 29, 1981

[54] VEHICLE OCCUPANT RESTRAINING SAFETY APPARATUS

[75] Inventor: Hisao Muramoto, Hiroshima, Japan

[73] Assignee: Toyo Kogyo Co., Ltd., Hiroshima, Japan

[21] Appl. No.: 97,548

[22] Filed: Nov. 26, 1979

[30] Foreign Application Priority Data

Nov. 29, 1978 [JP] Japan .................................. 53-148034

[51] Int. Cl.³ ...................... B60R 21/04; B60R 21/10
[52] U.S. Cl. .................................... 280/806; 280/751; 280/802; 297/488
[58] Field of Search ............... 280/801, 802, 803, 804, 280/806, 807, 808, 748, 751, 752; 297/483, 486, 487, 488

[56] References Cited

U.S. PATENT DOCUMENTS

| | | | |
|---|---|---|---|
| 3,931,988 | 1/1976 | Oehm et al. | 280/802 |
| 3,979,139 | 9/1976 | Hoffmann et al. | 280/751 |
| 4,032,175 | 6/1977 | Aibe et al. | 280/751 |
| 4,061,365 | 12/1977 | Nagano et al. | 280/804 |
| 4,124,224 | 11/1978 | Matsuoka | 280/807 |

Primary Examiner—Joseph F. Peters, Jr.
Assistant Examiner—Donn McGiehan
Attorney, Agent, or Firm—Wenderoth, Lind & Ponack

[57] ABSTRACT

A vehicle occupant restraining safety apparatus for use in a vehicle having at least one seat assembly installed inside the body of the vehicle and which includes an elongated knee protector positioned frontwardly of the seat assembly in face-to-face relationship to the knees of an occupant sitting on the seat assembly, a safety seat belt having one end thereof connected to the knee protector and the other end connected to the vehicle body at a position upwardly and rearwards of the back of the seat assembly, and a guide eye member through which a substantially intermediate portion of the seat belt loosely extends. While a portion of the seat belt on one side of the eye member and adjacent the one end thereof extends on one side of the seat assembly, another portion of the seat belt on the other side of the eye member and adjacent the other end thereof extends diagonally across the back of the seat assembly for restraining the body of the occupant.

5 Claims, 6 Drawing Figures

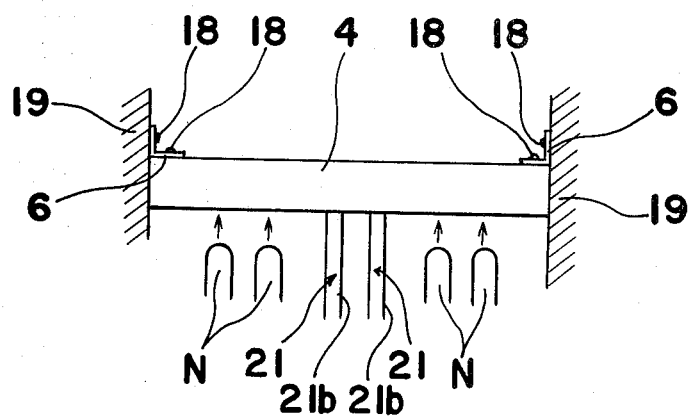
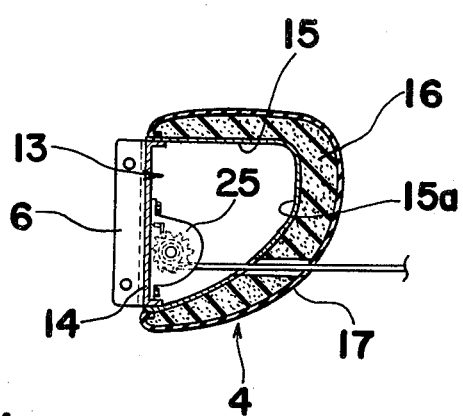
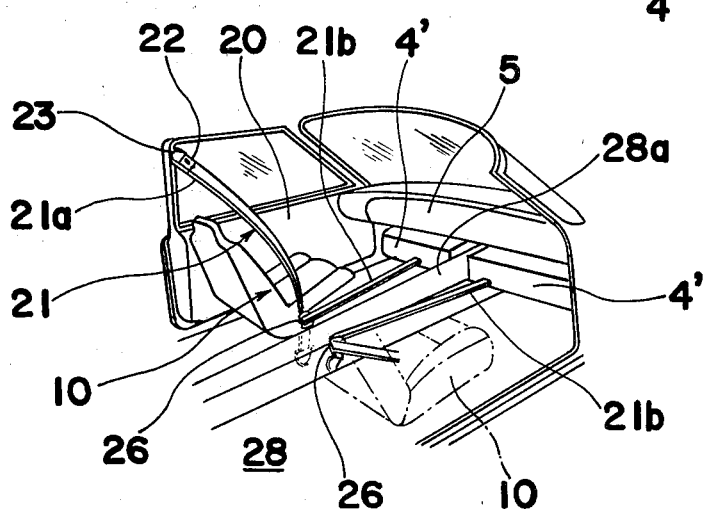

VEHICLE OCCUPANT RESTRAINING SAFETY APPARATUS

BACKGROUND OF THE INVENTION

The present invention relates generally to a safety seat belt apparatus for motor vehicles and, more particularly, to a vehicle occupant restraining safety apparatus for restraining the occupant sitting on a seat within a vehicle body and also for protecting the occupant's legs.

There is known an automotive vehicle, for example, a passenger car, wherein there is provided a vehicle occupant restraining safety apparatus including, in addition to a popular safety seat belt device, a knee protector for protecting the occupant's legs or knees in case of emergency, for example, at the time of vehicle collision. As best shown in FIG. 1 of the accompanying drawings which schematically illustrates, in side view, a front or driver's seat portion of the vehicle body, the safety seat belt device of the prior art vehicle occupant restraining safety apparatus comprises a safety seat belt 1 having one end removably connected by any suitable buckle assembly to a portion of the vehicle body, for example, either an upper region of a center pillar or a front door frame member 2, on one side of the front seat, and the other end connected to an automatic retractor 3 of any known construction which is rigidly secured to and installed on a portion of a floor panel intermediately of the width of the vehicle body. The knee protector, identified by 4 and employed in the same prior art vehicle occupant restraining safety apparatus, is installed below the vehicle instrument panel 5 with its opposite ends rigidly secured through brackets 6, as best shown in FIG. 2, to hinge pillars generally positioned frontwardly of and on respective sides of the driver's seat, a substantially intermediate portion of said knee protector 4 extending widthwise of the vehicle body. The knee protector 4 employed in the prior art vehicle occupant restraining safety apparatus is operatively isolated from the safety seat belt device and, therefore, has no relation to the operation of the safety seat belt device. This results in the following problem which is not negligible from the standpoint of safety of the vehicle occupant.

Specifically, in case of vehicle collision, although the occupant sitting on the seat inside the vehicle body appears to be firmly restrained by the safety seat belt 1 when the retractor 3 is held in a locked position so as not to permit the safety seat belt 1 to be loosely drawn out of the retractor 3, an appreciable length of the safety seat belt 1 is, in practice, pulled out of the retractor 3 by the action of the thrust force imposed by the occupant on the safety seat belt 1 before the retractor 3 is brought to the locked position. Until the retractor 3 is completely brought into the locked position, the occupant moves frontwardly and, at the same time, hits the knee protector 4 with his knees during the forward bodily movement. When the occupant's knees hit the knee protector 4 in the manner described above, the knee protector 4 elastically deforms and protrudes in a direction parallel to the direction in which the thrust force acts, to such an extent that it may cause physical damage to the occupant.

SUMMARY OF THE INVENTION

Accordingly, the present invention has been devised with a view to substantially eliminating the above described disadvantages and inconveniences inherent in the prior art occupant restraining safety apparatus and has for its essential object to provide an improved occupant restraining safety apparatus wherein the safety seat belt device and the knee protector are operatively, associated with each other to provide a relatively high degree of safety.

Another important object of the present invention is to provide an improved occupant restraining safety apparatus of the type referred to above, which can be manufactured economically by the utilization of the same or similar component parts as employed in the prior art apparatus and without requiring any complicated manufacturing procedure.

A further object of the present invention is to provide an improved occupant restraining safety apparatus of the type referred to above, which is reliable in operation and does not require any reinforcement for the knee protector inside the vehicle body.

These and other objects of the present invention can be accomplished by employing a safety seat belt having one end removably connected to a portion of the vehicle body on one side of a vehicle seat and the other end connected to the knee protector, a substantially intermediate portion of said safety seat belt being passed through an eye member which is secured to a floor panel at a position on the other side of the vehicle seat. By this arrangement, when the occupant sitting on the vehicle seat tends to move frontwardly under the influence of a thrust force which may occur in case of, for example, vehicle collision, a force acting to draw a portion of the safety seat belt between the eye member and the knee protector in a direction towards the eye member is exerted on the safety seat belt as a result of the occupant's foward bodily movement, and this force is counterbalanced by a force acting to deform the knee protector so as to protrude frontwardly of the occupant sitting on the vehicle seat, which latter force is exerted on the knee protector as a result of the contact of the occupant's knees with the knee protector, so that the occupant is firmly restrained on the vehicle seat by another portion of the safety seat belt between the eye member and the first mentioned end thereof.

Preferably, the second mentioned end of the safety seat belt employed in the present invention is connected to the knee protector by any known retractor.

BRIEF DESCRIPTION OF THE DRAWINGS

These and other objects and features of the present invention will become apparent from the following description taken in conjunction with preferred embodiments thereof with reference to the accompanying drawings, in which:

FIG. 4 is a schematic top plan view of the front seat portion of the vehicle shown in FIG. 3;

FIG. 5 is a cross sectional view, on an enlarged scale, taken along the line V—V in FIG. 4; and FIG. 6 is a view similar to FIG. 3, showing another preferred embodiment of the present invention.

DETAILED DESCRIPTION OF THE INVENTION

Figure 1:
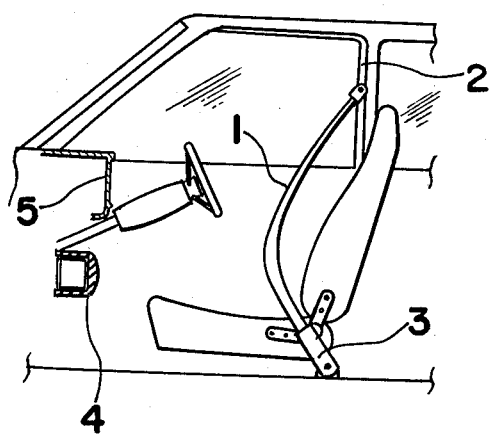
FIG. 1 is a schematic side view of a front seat portion of a vehicle with a front door removed, showing the prior art occupant restraining safety apparatus.

Before the description of the present invention proceeds, it is to be noted that like parts are designated by like reference numerals throughout the accompanying drawings. It is also to be noted that, for the purpose of facilitating a ready and better understanding of the present invention, the present invention will be described as applied to a passenger car of a type having separate front seat assemblies side by side with each other although it is equally applicable to a passenger car or any other automotive vehicle of a type having a single front seat assembly of two or three person capacity.

Figure 3:
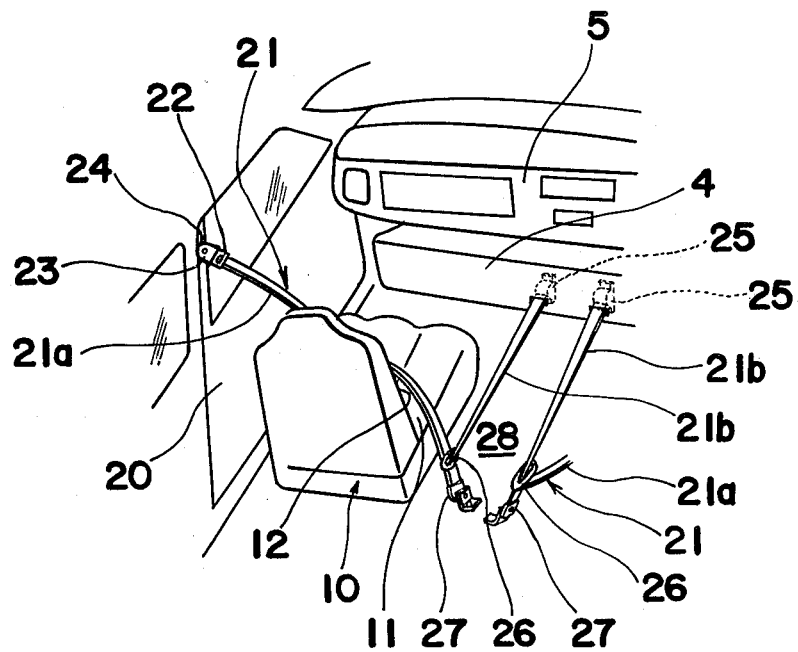
FIG. 3 is a schematic perspective view of a front seat portion of a vehicle, showing an improved occupant restraining safety apparatus according to a preferred embodiment of the present invention.

Referring now to FIGS. 3 to 5, the vehicle occupant restraining safety apparatus according to the present invention generally comprises, like the prior art occupant restraining safety apparatus shown in FIG. 1, a safety seat belt assembly for each bucket-type front seat assembly and an elongated knee protector 4 which is, so far as the embodiment shown in FIGS. 3 to 5 is concerned, employed for both of the bucket-type left-hand and right-hand front seat assemblies, only the left-hand front seat assembly being shown at 10 in FIG. 3 and composed of a seat 11 and a back 12 as is well known to those skilled in the art.

The knee protector 4 may be of any known construction, but as illustrated it comprises an elongated casing 13 having a generally triangular cross sectional shape made of a metallic material, for example, steel, and composed of an elongated base plate 14 and a cover plate 15 having a width larger than that of the base plate 14, said cover plate 15 having its opposite side edges rigidly secured to the corresponding side edges of the base plate 14 as to define a hollow space inside the casing 13. The portion of the cover plate 15 which faces the knees N of an occupant sitting on the seat assembly 10 is preferably inwardly curved relative to the base plate 14 as shown by 15a for the purpose of safety. The knee protector 4 further comprises a cushioning pad 16 of synthetic elastic material, for example, foamed urethane, covering the exterior surface of at least the cover plate 15 and held in position by an overlay upholstery 17 overlaying the cover plate 15 with the cushioning pad 16 positioned between the overlay upholstery 17 and the cover plate 15.

The knee protector 4 of the above described construction is positioned below the instrument panel 5 inside the vehicle body and frontwardly of the knees N of the occupant sitting on the seat assembly 10 and, as best shown in FIG. 4, has its opposite ends secured by substantially L-shaped brackets 6 in any known manner, for example, by the use of set bolts 18 to hinge pillars 19 to which left-hand and right-hand front doors (only the left-hand front door being shown by 20 in FIG. 3) are pivotally connected as is well known to those skilled in the art.

The safety seat belt assembly employed in the vehicle occupant restraining safety apparatus of the present invention comprises a single length of seat belt 21 composed of a restraining portion 21a and a tractive portion 21b extending continuously from the restraining portion 21a. It is to be noted that the boundary between the restraining and tractive portions 21a and 21b of the seat belt 21 is not fixed physically, but is determined by the different functions performed respectively by such portions of the seat belt 21 as can readily be understood from the subsequent description. As best shown in FIG. 3, one end of the seat belt 21 remote from the tractive portion 21b thereof has rigidly secured thereto a bayonet buckle 22 which is in turn removably or releasably connected to a tongue member 23 secured at 24 to the vehicle body at a position laterally upwardly of and rearwardly of the back 12 of the seat assembly 10, for example, a rear upper corner of the front door 20 as illustrated, whereas the other end of the seat belt 21 remote from the restraining portion 21a thereof extends loosely through the cover plate 15 and the cushioning pad 16 into the hollow space inside the casing 13 and is connected to any known automatic, self-locking retractor 25 which is preferably rigidly secured to the base plate 14 at a position substantially intermediately of the width of the vehicle body as best shown in FIG. 5, one retractor 25 being employed for each seat belt 21 and, hence, each seat assembly 10.

The safety seat belt assembly 21 further comprises a guide eye member 26 which may be a ring member and which is secured either directly or through a connecting strap 27 to a floor panel 28 at a position laterally of the hinged joint between the seat 11 and the back 12 and on the side of the seat assembly 10 opposite from the adjacent door 20. The seat belt 21 having its opposite ends connected to the vehicle body and the retractor 25, respectively, in the manner described above extends loosely through the guide eye member 26 such that the restraining and tractive portions 21a and 21b of the seat belt 21 are positioned on respective sides of the guide eye member 26. With the seat belt 21 arranged as hereinbefore described, the restraining portion 21a thereof extends diagonally across and frontwardly of the back 12 of the seat assembly 10 so that it can act to restrain the occupant against the seat assembly 10, particularly, the back 12 of the seat assembly 10 when the seat belt 21 itself is held taut by the operation of the retractor 25 in any known manner in case of emergency.

The vehicle occupant restraining safety apparatus of the construction described above and shown in FIGS. 3 to 5 operates in the following manner.

In case of a vehicle collision, the occupant sitting on the seat assembly 10 tends to be thrust forwards with his body stooping and his knees abutting the knee protector 4. When the occupant's knees abut the knee protector 4 in the manner described above, a substantially intermediate portion of the knee protector 4 tends to deform in a direction frontwardly of the occupant. However, in practice, since the retractor 25 is held in the locked position at the time of vehicle collision and since the seat belt 21 can, therefore, no longer be drawn out of the retractor 25, that substantially intermediate portion of the knee protector 4 tends to be drawn in a direction towards the occupant sitting on the seat assembly 10 by the action of a drawing force developed in the tractive portion 21b of the seat belt 21. Specifically, this drawing force tending to draw that substantially intermediate portion of the knee protector 4 in a direction towards the occupant sitting on the seat assembly 10 is developed as a result of the forward bodily movement of the occupant pulling the restraining portion 21a of the seat belt 21 in such a direction as to cause the tractive portion 21b of the same seat belt 21 to be drawn in a direction rearwardly toward the occupant and away from the knee protector 4.

Accordingly, under these circumstances, a force tending to deform the knee protector 4 in a direction forwardly of the occupant sitting on the seat assembly 10 as a result of abutment of the occupant's knees against such protector 4 is so counterbalanced by the drawing force transmitted to the knee protector 4 by way of the tractive portion 21b of the seat belt 21 that the deformation of the knee protector 4 in the direction forwardly of the occupant, which may result in breakage of the knee protector if it is excessively deformed, can advantageously be minimized. This also means that the excessive forward bodily movement of the occupant can advantageously be restrained because the pulling of the restraining portion 21a of the seat belt 21 incident to the forward bodily movement, especially the stooping, of the occupant is minimized or substantially eliminated by the action of the force transmitted from the occupant's knees to the knee protector 4 and tending to deform the knee protector 4 so as to protrude in a direction forwardly of the occupant thereby pulling the tractive portion 21b of the seat belt 21 in a direction counter to the direction in which the restraining portion 21 is pulled.

In the foregoing embodiment described with reference to FIGS. 3 to 5, the knee protector 4 has been described as secured at its opposite ends to the vehicle body, particularly to the hinge pillars 19, the substantially intermediate portion of which is 'floating,' that is, in no way supported. However, the substantially intermediate portion of the knee protector 4 employed in the present invention may be connected at at least one location to the vehicle body, for example, either the floor panel 28 or a dash panel which is continuous with the floor panel 28 and where acceleration, brake and clutch pedals are installed as is well known to those skilled in the art, by the use of any suitable support bracket of simple construction which need not have great rigidity. Even though the knee protector 4 employed in the present invention is supported by the vehicle body at at least three locations in the manner described above, it satisfactorily and effectively serves as means for protecting the knees of the occupant sitting on the seat assembly 10.

Figure 2:
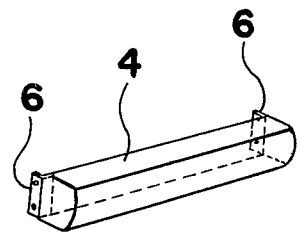
FIG. 2 is a perspective view of a knee protector employed in the prior art occupant restraining safety apparatus, but which may be employed in the present invention as well.

Should any difficulty be involved in installation of the single elongated knee protector 4 at the definite position inside the vehicle body of a type having the floor panel 28 formed with a propeller shaft tunnel which extends lengthwise of the vehicle body at a position intermediately of the width of the vehicle body as is well known to those skilled in the art, two knee protectors of identical construction, but each being smaller in length than that of the knee protector 4 shown in FIGS. 3 and 4, may be employed as shown generally by 4' in FIG. 6. In the embodiment shown in FIG. 6, two knee protectors 4' are employed, one for each front seat assembly 10 or each safety seat belt assembly and each of the knee protectors 4' is rigidly secured at one end to the adjacent hinge pillar by means of a bracket, such as shown by 6 in FIGS. 2 and 4, and at the other end to the propeller shaft tunnel 28a by the use of at least one bracket which may be similar to the bracket 6. Each knee protector 4' in the embodiment shown in FIG. 6 functions in a manner substantially similar to the knee protector 4 in the foregoing embodiment of FIGS. 3 to 5.

Although the present invention has fully been described in connection with the preferred embodiments thereof with reference to the accompanying drawings, it is to be noted that various changes and modifications will be apparent to those skilled in the art. By way of example, although the end of the safety seat belt 21 remote from the retractor 25 has been described as releaseably connected to the tongue member 23 through the bayonet buckle 22, it may be rigidly secured to the rear upper corner 24 of the hingedly supported door 20 either directly or by way of the tongue member 23. Whether or not the buckle 22 is employed, to connect the end of the seat belt 21 to the rear upper corner 24 of the hingedly supported door 20 is advantageous in that, by selectively opening and closing the door 20, the occupant can automatically be released and restrained, respectively.

Moreover, the point of connection of the end of the seat belt 21 to the vehicle body is not always limited as described above, but it may be connected to an upper region of a center pillar on one side of the door 20 opposite to the corresponding hinge pillar. In this case, the use of the buckle 22 and the tongue member 23 is essential so that the occupant can be released from the restraining portion 21a of the seat belt by disengaging the buckle 22 from the tongue member 23. In addition, the same end of the seat belt 21 may be connected to a movably supported tongue member forming a part of any known automatic releasing mechanism, such as disclosed in the U.S. Pat. No. 3,889,971 patented on June 17, 1975, which may be so designed as to cause the movably supported tongue member to move the restraining portion 21a of the seat belt 21 away from the occupant sitting on the seat assembly when the door 20 is opened.

The use of the retractor 25 is not essential and the end of the seat belt 21, which has been described as connected to the retractor 25, may be rigidly secured to the knee protector 4 or 4'. Where one end of the seat belt 21 is rigidly connected to the knee protector, the other end of the seat belt 21 may be connected to the vehicle body through a retractor similar in construction to the retractor 25 by means of a combination of a bayonet buckle and a tongue member connected between said other end of the seat belt 21 and the retractor.

Furthermore, the guide eye member 26 which has been described as connected to the floor panel 28 may be connected to the seat assembly 10 on the side remote from the door 20 either directly or through a connecting strap and at a position adjacent the hinged joint between the seat 11 and the buckle 12.

Accordingly, such changes and modifications are to be understood as being included within the true scope of the present invention unless they depart therefrom.

I claim:

1. A vehicle occupant restraining safety apparatus for use in a vehicle having at least one seat assembly installed inside the body of the vehicle, which comprises, in combination:

an elongated and bendable knee protector mounted inside the vehicle body and frontwardly of the seat assembly in face-to-face relationship to the position of the knees of an occupant who may sit on the seat assembly, said knee protector being supported at its opposite end portions on the vehicle body and having an elongated base member and a cushioning means covering at least the surface area of the base member which faces toward the position of the knees of the occupant;

a safety seat belt having first and second opposite ends, said first and second ends of the seat belt being respectively connected to the knee protector and the vehicle body, the point of connection of the first end of the seat belt to the knee protector being located on one of the opposite sides of the seat assembly and frontwardly of the seat assembly and the point of connection of the second end of the seat belt to the vehicle body being located on the other of said opposite sides of the seat assembly and upwardly and rearwards of the seat assembly;

a guide eye member rigidly connected to the vehicle body at a position on said one of said opposite sides of the seat assembly and downwardly and rearwards of the seat assembly, said seat belt extending loosely through said guide eye member such that a first portion of the seat belt adjacent the first end thereof extends on said one of the opposite sides of the seat assembly between the guide eye member and the knee protector and a second portion of the seat belt adjacent the second end extends diagonally across the back of the seat assembly and frontwardly of the occupant; and an automatic self-locking retractor connected between one of said first and second ends of the seat belt and the structure to which said one end is connected.

2. A vehicle occupant restraining safety apparatus as claimed in claim 1 in which said retractor is connected between the first end of said seat belt and said knee protector.

3. A vehicle occupant restraining safety apparatus as claimed in claim 1 in which said retractor is connected between the second end of said seat belt and the vehicle body.

4. An apparatus as claimed in claim 1, wherein said base member comprises an elongated hollow casing.

5. An apparatus as claimed in claim 1 or 4, further comprising means interposed between the second end of the seat belt and the vehicle body for releaseably connecting the second end of the seat belt to the vehicle body.

* * * * *